United States Patent
Artigue et al.

(10) Patent No.: US 9,959,039 B2
(45) Date of Patent: May 1, 2018

(54) TOUCHSCREEN KEYBOARD

(71) Applicant: International Business Machines Corporation, Armonk, NY (US)

(72) Inventors: Olivier Artigue, Bures sur Yvette (FR); Jean-Michel Douliez, Osny (FR); Francois Trible, Montrouge (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 14/324,282

(22) Filed: Jul. 7, 2014

(65) Prior Publication Data
US 2015/0012869 A1 Jan. 8, 2015

(30) Foreign Application Priority Data
Jul. 8, 2013 (GB) .................................. 1312184.3

(51) Int. Cl.
*G06F 3/0488* (2013.01)

(52) U.S. Cl.
CPC ...... *G06F 3/04886* (2013.01); *G06F 3/04883* (2013.01)

(58) Field of Classification Search
CPC .......................... G06F 3/04886; G06F 3/04883
See application file for complete search history.

(56) References Cited

U.S. PATENT DOCUMENTS

| | | | |
|---|---|---|---|
| 7,336,263 B2 | 2/2008 | Valikangas | |
| 7,649,536 B1 * | 1/2010 | Eng | G06F 3/038 345/474 |
| 2008/0284744 A1 * | 11/2008 | Park | G06F 3/04886 345/173 |
| 2009/0303200 A1 * | 12/2009 | Grad | G06F 3/0416 345/173 |
| 2010/0053105 A1 * | 3/2010 | Choi | G06F 3/04886 345/173 |

(Continued)

FOREIGN PATENT DOCUMENTS

| | | |
|---|---|---|
| EP | 1555601 A2 | 7/2005 |
| EP | 1998245 A2 | 3/2008 |

(Continued)

OTHER PUBLICATIONS

Patrick Jordan, "IPad Keyboard in iOS 5: Split It, Move It Up and Down the Page, Dock It," Jun. 2010, 2 pages.

(Continued)

*Primary Examiner* — Abdullah Al Kawsar
*Assistant Examiner* — Sean Hsiao
(74) *Attorney, Agent, or Firm* — Cantor Colburn LLP; Nicholas Bowman

(57) ABSTRACT

Operating a touch-screen device includes displaying at least a portion of a keyboard on a touch-screen, detecting a touch on the touch-screen, and detecting movement of the touch on the touch-screen. Operating the touch-screen device also includes moving the displayed keyboard in response to the detected movement of the touch on the touch-screen, detecting a release of the touch from the touch-screen, and assigning a character according to a final location of the touch relative to a location of the displayed keyboard.

20 Claims, 5 Drawing Sheets

(56) References Cited

U.S. PATENT DOCUMENTS

| | | | |
|---|---|---|---|
| 2010/0156798 A1* | 6/2010 | Archer | G06F 3/017 345/169 |
| 2010/0156807 A1* | 6/2010 | Stallings | G06F 3/04886 345/173 |
| 2010/0177121 A1* | 7/2010 | Homma | G06F 3/0416 345/659 |
| 2011/0050576 A1 | 3/2011 | Forutanpour et al. | |
| 2011/0242138 A1* | 10/2011 | Tribble | G06F 3/04886 345/663 |
| 2011/0248945 A1 | 10/2011 | Higashitani | |
| 2011/0285631 A1* | 11/2011 | Imamura | G06F 1/1616 345/168 |
| 2011/0285656 A1* | 11/2011 | Yaksick | G06F 3/04886 345/173 |
| 2012/0062465 A1 | 3/2012 | Spetalnick | |
| 2012/0113023 A1* | 5/2012 | Koch | G06F 3/04886 345/173 |
| 2012/0117505 A1 | 5/2012 | Koch et al. | |
| 2012/0206363 A1* | 8/2012 | Kyprianou | G06F 3/04886 345/168 |
| 2012/0272175 A1* | 10/2012 | Lin | G06F 3/0487 715/773 |
| 2013/0027434 A1 | 1/2013 | Paul | |
| 2013/0169540 A1 | 7/2013 | Dinh | |
| 2013/0234942 A1* | 9/2013 | Yoo | G06F 3/04886 345/168 |

FOREIGN PATENT DOCUMENTS

| | | |
|---|---|---|
| JP | 2003196007 A | 7/2003 |
| WO | 2012127733 A1 | 9/2012 |

OTHER PUBLICATIONS

UK International Search Report for Application No. GB1312184.3 dated Dec. 19, 2013, 4 pages.

Paisios et al., "Mobile Brailler: Making Touch-Screen Typing Accessible to Visually Impaired Users," Computer Science, New York University, 2012, 4 pages.

Block et al., "Touch-Display Keyboards: Transforming Keyboards into Interactive Surfaces," Lancaster University, CHI 2010, Apr. 10-15, 2010, 10 pages.

\* cited by examiner

TOUCHSCREEN KEYBOARD

CROSS-REFERENCE TO RELATED APPLICATIONS

This application claims priority to Great Britain Patent Application No. 1312184.3, filed 8 Jul. 2013, and all the benefits accruing therefrom under 35 U.S.C. § 119, the contents of which in its entirety are herein incorporated by reference.

BACKGROUND

The present disclosure relates generally to touch-screen technology and, more particularly, to a touch-screen device and method of operation.

In the mobile telephony world, touch sensitive devices enable soft keyboard usage, which keyboard is used for entering textual information, such as when a user is filling in a web form or sending a message. Soft keyboards refer to a software implementation of an otherwise hardware-based keyboard. Soft keyboards can be shown on demand and can be adapted to different locales and participants' preferences. In addition, an on-screen keyboard helps to support hardware size reduction.

Soft keyboards are designed to fit entirely into the screen real estate, and oftentimes a mobile telephone is used in portrait mode. In such a context, where a small portion of the screen is reserved for the keyboard area, a user may experience difficulties in accurately typing a key that is not readily seen, as the user's finger often occupies the space of two or more keyboard letters. This can result in the user depressing the wrong key.

SUMMARY

According to a first aspect of the present invention, there is provided a method of operating a touch-screen device. The method includes displaying at least a portion of a keyboard on a touch-screen of the touch-screen device, detecting a touch on the touch-screen, and detecting movement of the touch on the touch-screen. The method also includes moving the displayed keyboard in response to the detected movement of the touch on the touch-screen, detecting a release of the touch from the touch-screen, and assigning a character according to a final location of the touch relative to a location of the displayed keyboard.

According to a second aspect of the present invention, there is provided a touch-screen device. The touch-screen device includes a touch-screen and a processor connected to the touch-screen. The processor is configured to display at least a portion of a keyboard on the touch-screen, detect a touch on the touch-screen, and detect movement of the touch on the touch-screen. The processor is also configured to move the displayed keyboard in response to the detected movement of the touch on the touch-screen, detect a release of the touch from the touch-screen, and assign a character according to a final location of the touch relative to a location of the displayed keyboard.

According to a third aspect of the present invention, there is provided a computer program product for operating a touch-screen device. The computer program product includes a computer readable storage medium having program instructions embodied therewith, the program instructions readable by a processing circuit to cause the processing circuit to display at least a portion of a keyboard on a touch-screen of the touch-screen device, detect a touch on the touch-screen, and detect movement of the touch on the touch-screen. The product further includes instructions for moving the displayed keyboard in response to the detected movement of the touch on the touch-screen, detecting a release of the touch from the touch-screen, and assigning a character according to a final location of the touch relative to a location of the displayed keyboard.

BRIEF DESCRIPTION OF THE SEVERAL VIEWS OF THE DRAWINGS

Embodiments of the present invention will now be described, by way of example only, with reference to the following drawings, in which.

DETAILED DESCRIPTION

Figure 1:
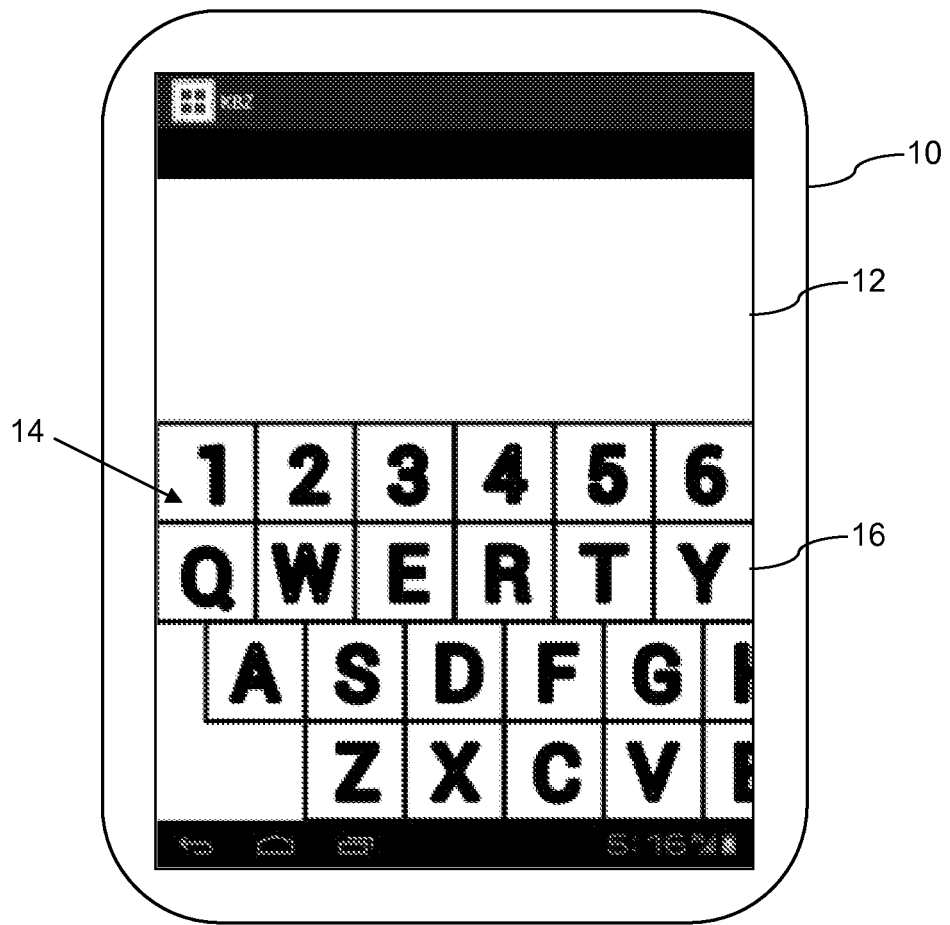
FIGS. 1 to 4 are schematic diagrams of a touch-screen device.

Embodiments of the present disclosure provide an improved on-screen keyboard having relatively large keys and is straightforward to operate. The embodiments provide a means for helping users efficiently use soft keyboards and to minimize the number of incorrect inputs. The improved touch-screen device minimizes the number of input errors when touching soft keyboards for users whose fingers are too large for consistently accurately selecting a key. Since a user's fingers cannot be made smaller, the soft keyboard is enlarged thereby increasing the key size so that users can type without error.

Increasing the touch key size also implies increasing the size of the full keyboard itself, such that the keyboard may no longer fit within the screen real estate, thereby resulting in out-of-screen keys not being directly accessible to the user. The embodiments described herein provide a keyboard that is 'floatable' within the screen bounds and moves in such a way that as user's finger moves, the target key is displaced toward the moving finger. In other words, the user's finger and keyboard move in opposite directions so that the finger and target key become closer.

According to some embodiments, a set of two events are used for the target key to be recognized, as compared to a fixed keyboard (which is entirely accessible), in that a single touch down event is sufficient for a key to be selected. In the embodiments described herein, the touch-screen device offers the user two capabilities: the capability to make any key, including off screen keys, reachable by sliding the keyboard in the opposite finger direction; and the capability to select any available key, including accentuated popup characters. Both of these capabilities are handled using different touch events. The first event is implemented by touch drag event recognition, and the second event is implemented using touch up recognition. The touch down event is used only to initialize the starting point of the first drag vector direction. In the case where the key is directly accessible to the user (no drag is involved) the user simply needs to act the same way as for a normal keyboard, the selected key being also recognized with the touch up event.

The touch-screen also offers the user the capability to adjust the full keyboard size by zooming the keyboard. This capability is handled using the recognition of a "pinch" gesture that consists in detecting two finger gestures and calculating a zoom factor using the variation of distance between both the fingers on each drag event. Once the zoom factor is obtained, the touch-screen device checks that the keyboard width is at least as large as the screen width and that the screen height is at least as big as the keyboard height before zooming the keyboard. This ensures that the keyboard remains usable.

When a user needs to select an accentuated character by using a popup sub keyboard containing all of the accentuated derivatives from the selected character, the touch-screen device can track the change of position of the user's finger on a key over time and deduce that while this position does not change and the touch up event does not occur, the touch-screen device can popup an accentuated characters sub keyboard, if available, for the considered key. This allows the user to access accented characters, for example, while still offering the functionality of allowing a larger keyboard to be used.

In an embodiment, the step of moving the displayed keyboard in response to the detected movement of the touch on the touch-screen includes moving the displayed keyboard in the opposite direction to the detected movement of the touch on the touch-screen and moving the displayed keyboard an equal distance to the detected movement of the touch on the touch-screen. As the user touches the touch-screen device with his finger and starts to move his finger across the touch-screen (in any direction), the keyboard displayed on the touch-screen starts to move in an equal and opposite manner to the movement of the user's finger. This effectively scrolls the keyboard across the touch-screen, allowing the user to access those keys of the keyboard that are not currently displayed on the touch-screen. The use of an equal and opposite rate of movement gives the most user friendly and logical movement of the keyboard in response to the user's moving touch and provides the user with an intuitive interaction with the soft keyboard of the touch-screen.

Turning now to FIG. 1, a touch-screen 10 is provided. The touch-screen device 10, here a mobile phone, has a touch-screen 12 occupying the vast majority of the front of the touch-screen device 10. The user interacts with the touch-screen device 10 primarily by touching the touch-screen 12 with his finger or with a suitable stylus, depending upon the type of touch-screen 12 being used in the touch-screen device 10. The touch-screen device 10 is controlled by an internal processor, under the operation of a suitable computer program, which is connected to the touch-screen 12 and receives the user's inputs on the touch-screen 12 and controls the output on the touch-screen 12 accordingly. The user controls the touch-screen device 10 by interacting with the touch-screen 12.

The touch-screen device 10 is controlled by the processor to display a soft keyboard 14 on the touch-screen 12. The keyboard 14 is "soft" in the sense that it is not a hardware keyboard such as used with a conventional desktop PC but is a software implementation of the keyboard. Only a portion of the keyboard 14 is currently visible on the touch-screen 12. This allows the individual keys 16 of the keyboard 14 to be larger than would otherwise be the case if the entire keyboard 14 was shown on the touch-screen 12. However, by enlarging the keys 16, certain keys 16 are not directly accessible to the user.

The soft keyboard 14 shown on the touch-screen 12 of the touch-screen device 10 is a standard QWERTY keyboard that is very widely used in the Western world. The vast majority of typewriters and computer keyboards in the Western world use this layout of keys, which arranges the keys according to their frequency in the English language, mapping the common keys to the easiest position to find with the fingers of the user's hands. The common user will know that the layout of the keys of the keyboard 14 imply that the remainder of the keys are (virtually) off the touch-screen 12 to the right-hand side and cannot be directly accessed.

Figure 2:
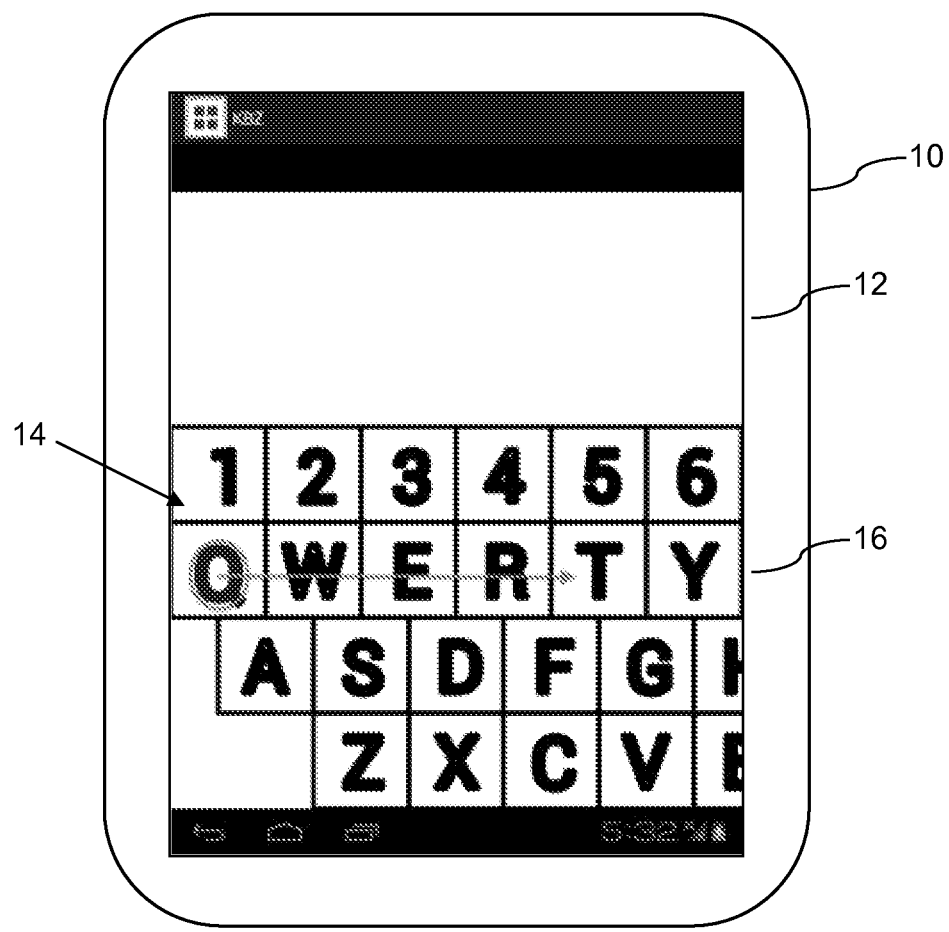

FIG. 2 illustrates how a user accesses a key that is not currently visible on the touch-screen 12. In this example, the user wishes to access the key "P", which is not part of the portion of the keyboard 14 currently being displayed on the touch-screen 12. The letter "P" on a standard QWERTY keyboard is found on the top line of letters at the furthest point to the right-hand side. It is not necessary that the user know the exact location of the key in question, only that he be aware that it is not currently visible. The user touches down on a first letter (here the letter "Q") and starts dragging his finger to the right.

When the user drags his finger towards the target letter, the keyboard 14 is moved in the opposite direction to the movement of the finger, thereby showing parts of the keyboard 14 that were previously hidden. In an embodiment, the movement of the keyboard 14 is equal and opposite to the movement of the user's touch on the touch-screen 12. This provides a simple and intuitive movement of the keyboard 14, in response to the detected movement of the user's touch on the touch-screen 12. The user is now able to reach those characters that were not previously directly accessible, as they were not part of the portion of the keyboard visible from the starting position.

Figure 3:
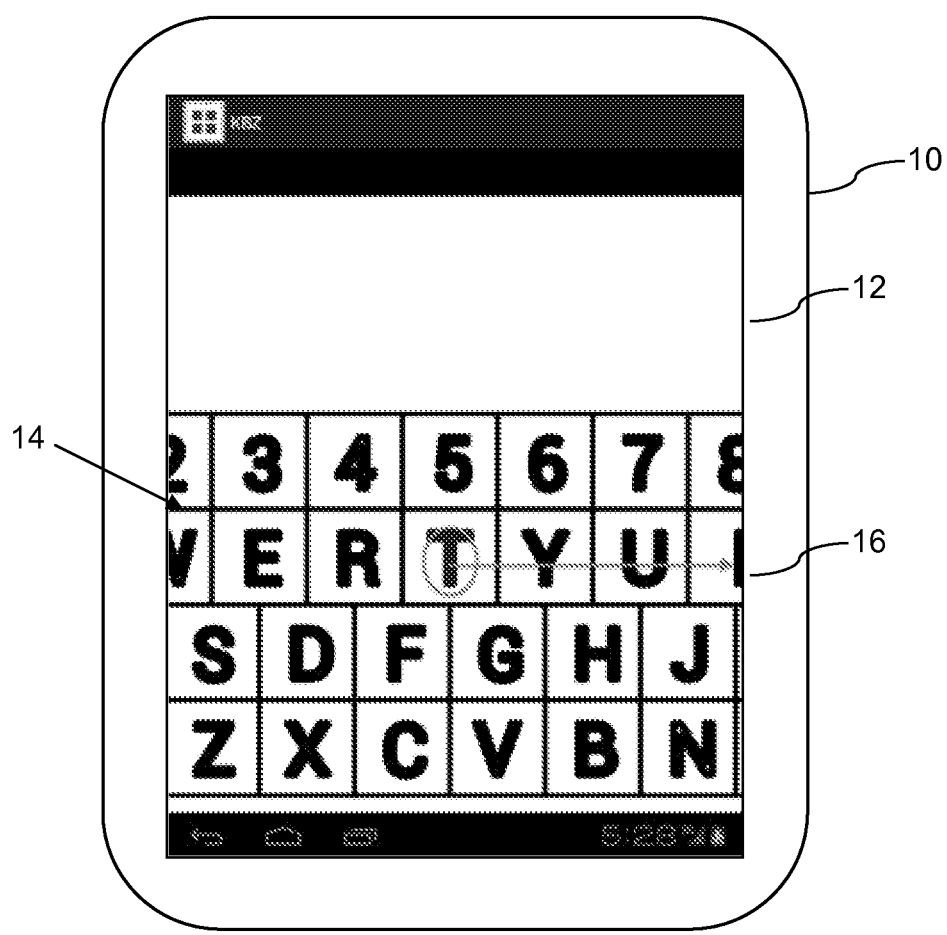

FIG. 3 shows the user continuing to drag his finger towards the target letter "P". The view shown in this Figure is an intermediate position, the letter "T" is currently highlighted, in order to show the current key 16 that the user is selecting. The keyboard 14 has moved to the left in this Figure relative to the position of the keyboard 14 in FIGS. 1 and 2. As the user continues to drag his touch to the right, then the keyboard 14 will continue to move to the left in an equal and opposite motion. The processor of the touch-screen device 10 controls the scrolling of the keyboard 14 in response to the detection of the user's movement of his finger across the touch-screen 12.

Figure 4:
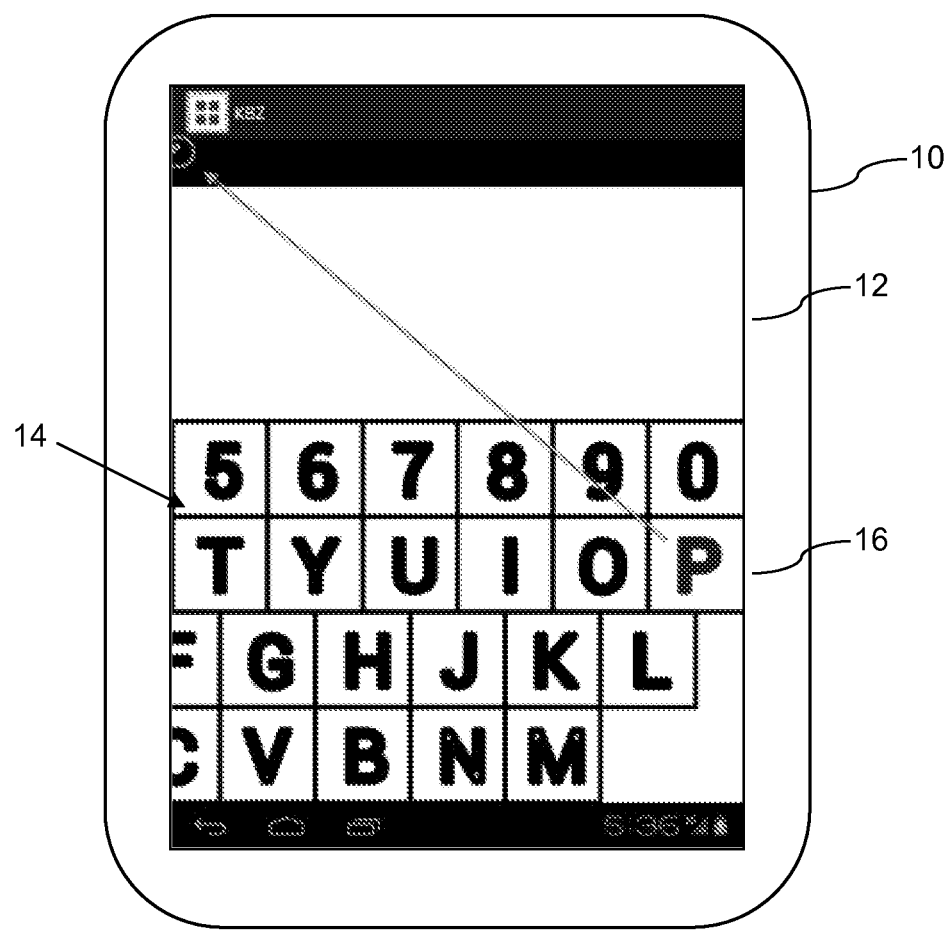

Once the user has moved his finger across the touch-screen 12 to reach the target letter, he can then release his finger in order to select the desired character. FIG. 4 shows the user releasing his finger from the target letter "P", which results in the processor of the touch-screen device 10 assigning the character "P" according to the final location of the user's touch relative to the location of the displayed keyboard 14. As can be seen in this Figure, the letter "P" has now been displayed at the text cursor and the user can continue selecting keys 16 of the keyboard 14 to continue typing. If the user needs to select a key 16 that is not currently visible, then as before, he can drag his finger on the touch-screen 12 to cause the keyboard 14 to move in the opposite direction to the drag movement.

Figure 5:
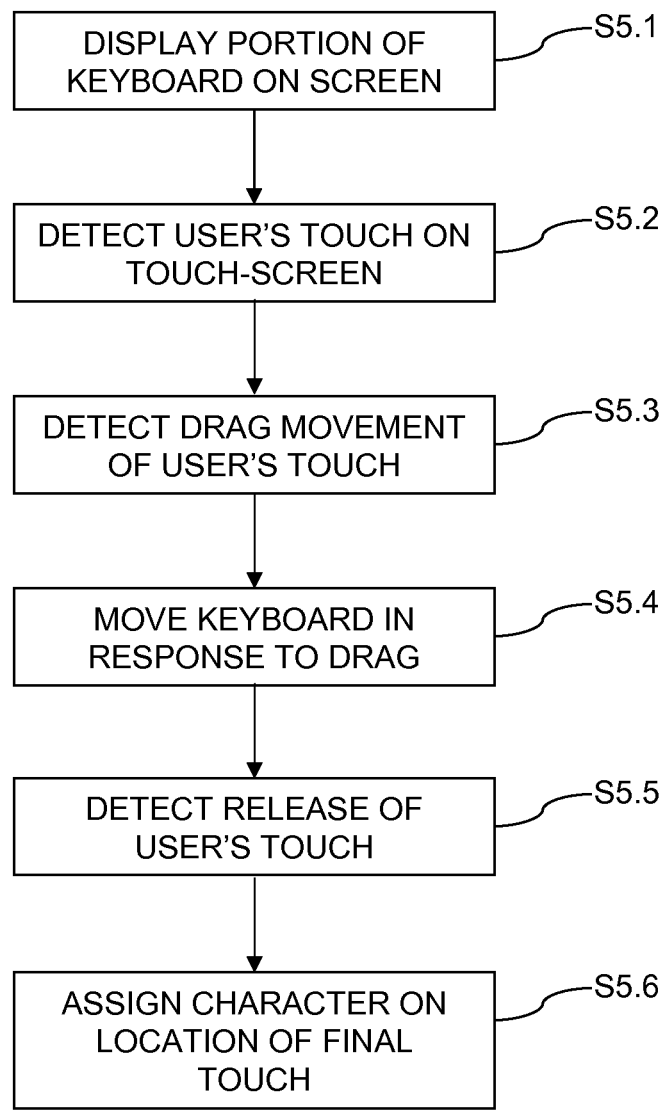
FIG. 5 is a flowchart of a method of operating a touch-screen device.

FIG. 5 shows a flowchart summarizing the method of operating the touch-screen device 10. The method includes, at block S5.1, displaying at least a portion of the keyboard 14 on the touch-screen 12. When the user is operating the touch-screen device 10 in any mode that requires a text input, then the keyboard 14 is shown in a lower portion of the touch-screen 12, as illustrated in FIG. 1. This portion of the keyboard 14 that is shown is either a predefined start portion or is the last displayed portion, from the user's last interaction with the keyboard 14.

At block S5.2, a touch is detected on the touch-screen 12. This touch could be with the user's finger or with a stylus; this is not material to the operation of the method. At block S5.3, movement of the touch on the touch-screen 12 is detected, which indicates that the user is performing a dragging motion of his finger (or stylus). At block S5.4, the displayed keyboard 14 is moved in response to the detected movement of the touch on the touch-screen 12. As discussed above, in an embodiment, this movement is equal and opposite to the detected movement of the touch on the touch-screen 12.

At block S5.5, the release of the touch from the touch-screen 12 is detected, and at block S5.6, a character is assigned according to the final location of the touch relative to the location of the displayed keyboard 14. Once the processor of the touch-screen device 10 detects that the user's touch has been released, then a character is assigned to the touch, according to the position of the last touch relative to the keyboard's position as currently displayed on the touch-screen 12. In this way, an improved input method is delivered, which can use relatively larger keys on the keyboard and can still provide the user with easy access to all of the keys of the keyboard.

The processor of the touch-screen device 10 may operate the following pseudo-code in controlling the operation of the touch-screen 12:
1. layout the keyboard
2. adjust the keyboard size so that its height fits the screen height and that the screen width is only a part of the keyboard width (a maximum of two vertically aligned keyboard corners must be visible at the same time)
3. wait for an event (global event loop)
   3.1. if a finger touch down appears
   3.1.1. identify the letter under the finger (if any)
   3.1.2. if the next event is a one finger drag event
      3.1.2.1. calculate the finger position difference between this event and the previous one: in other words, calculate the finger displacement
      3.1.2.2. if the displacement is not zero
         3.1.2.2.1. check whether any keyboard corner cannot move inside the view as a result of this displacement and eventually modify the displacement values accordingly
         3.1.2.2.2. move the keyboard in the opposite direction to the finger using the calculation result
         3.1.2.2.3. identify the current overfly key
      3.1.2.3. else if the finger is stationary for a sufficient amount of time
         3.1.2.3.1. process eventual accentuated character if available.
   3.1.3. else if it is a one finger touch up event
      3.1.3.1. identify the selected key and send it to the interested component
   3.1.4. else return in the global event loop step
   3.2. else if a screen orientation changes, return to the adjust to screen step (step 2)

In this way, the touch-screen device 10 provides the improved methodology. Non-standard characters can be delivered by the process, as once the user has scrolled the keyboard 14 to reach a desired key, if he maintains his touch on the specific character for a short period of time, a sub-keyboard is displayed by the touch-screen 12 and the user can make a second touch on the sub-keyboard to indicate which character he wishes to select. All other normal functions on the keyboard 14 may work as usual, such as backspace and return, and the user can access these functions by scrolling the keyboard with finger dragging to reach these function keys in the same manner as described above.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of operating a touch-screen device, the method comprising:
    displaying a first portion of a keyboard on a touch-screen of the touch-screen device, the first portion of the keyboard containing a first corner of the keyboard and not containing a second corner of the keyboard opposing the first corner, wherein the first corner and the second corner define, at least in part, an outer periphery of the keyboard,
    detecting a touch on the touch-screen,
    detecting movement of the touch on the touch-screen,
    determining a first touch displacement value associated with the detected movement of the touch,
    determining, based at least in part on the first touch displacement value moving the keyboard on the touch-screen in a direction opposite to a direction of the detected movement of the touch and causing the first corner of the displayed keyboard to move out of a viewing area of the touch-screen, that the first touch displacement value is not sufficient to cause the second corner of the displayed keyboard to move into the viewing area of the touch-screen when the detected touch reaches an edge of the touch-screen,
    modifying the first touch displacement value to generate a second touch displacement value associated with the detected movement of the touch, wherein the second touch displacement value is sufficient to cause the second corner to move within the viewing area,
    moving the displayed keyboard based at least in part on the second touch displacement value to cause a second portion of the keyboard to be displayed on the touch-screen, the second portion of the keyboard containing the second corner and not containing the first corner,
    detecting a release of the touch from the touch-screen, and
    assigning a character according to a final location of the touch relative to a location of the displayed keyboard.

2. The method of claim 1, wherein the displaying includes adjusting a size of the keyboard such that a first height of the keyboard fits a first height of the touch-screen and a first width of the touch-screen displays only a portion of the keyboard, the method further comprising:
    upon detecting a change to an orientation of the touch-screen, re-adjusting the size such that a second height of the keyboard fits a second height of the touch-screen and a second width of the touch-screen displays the portion of the keyboard.

3. The method of claim 1, wherein the moving the displayed comprises moving the displayed keyboard in the opposite direction to the detected movement of the touch on the touch-screen.

4. The method of claim 1, wherein determining the first touch displacement value comprises:
- calculating a distance between a starting location of the touch and a current location of the touch resulting from the movement.

5. The method of claim 1, wherein moving the displayed keyboard comprises moving the displayed keyboard a distance that is greater than the first displacement value.

6. The method of claim 1, further comprising highlighting the character currently located under the touch on the touch-screen.

7. The method of claim 1, further comprising enlarging the displayed keyboard in response to a defined user input.

8. The method of claim 1, wherein the detecting the release of the touch from the touch-screen comprises:
- identifying a key on the displayed keyboard corresponding a location of the release; and
- assigning the key as a final location of the touch-screen.

9. The method of claim 1, wherein the touch is implemented by at least one of a finger and a stylus.

10. The method of claim 1, wherein movement of the displayed keyboard ceases prior to release of the touch from the touch-screen.

11. A touch-screen device, comprising:
- a touch-screen; and
- a processor connected to the touch-screen, the processor configured to:
- display a first portion of a keyboard on the touch-screen, the first portion of the keyboard containing a first corner of the keyboard and not containing a second corner of the keyboard opposing the first corner, wherein the first corner and the second corner define, at least in part, an outer periphery of the keyboard,
- detect a touch on the touch-screen,
- detect movement of the touch on the touch-screen,
- determine a first touch displacement value associated with the detected movement of the touch,
- determine, based at least in part on the first touch displacement value moving the keyboard on the touch-screen in a direction opposite to a direction of the detected movement of the touch and causing the first corner of the displayed keyboard to move out of a viewing area of the touch-screen, that the first touch displacement value is not sufficient to cause the second corner of the displayed keyboard to move into the viewing area of the touch-screen when the detected touch reaches an edge of the touch-screen,
- modify the first touch displacement value to generate a second touch displacement value associated with the detected movement of the touch, wherein the second touch displacement value is sufficient to cause the second corner to move within the viewing area,
- move the displayed keyboard based at least in part on the second touch displacement value to cause a second portion of the keyboard to be displayed on the touch-screen, the second of the keyboard containing the second corner and not containing the first corner,
- detect a release of the touch from the touch-screen, and
- assign a character according to a final location of the touch relative to a location of the displayed keyboard.

12. The device of claim 11, wherein the processor is configured, when moving the displayed keyboard, to move the displayed keyboard in the opposite direction to the detected movement of the touch on the touch-screen.

13. The device of claim 11, wherein the processor is configured, when moving the displayed keyboard, to move the displayed keyboard a distance that is greater than the first displacement value.

14. The device of claim 11, wherein the processor is further configured to highlight the character currently located under the touch on the touch-screen.

15. The device of claim 11, wherein the processor is further configured to enlarge the displayed keyboard in response to a defined user input.

16. A computer program product for operating a touch-screen device,
- the computer program product comprising a computer readable storage medium having program instructions embodied therewith, the program instructions readable by a processing circuit to cause the processing circuit to perform:
- displaying a first portion of a keyboard on a touch-screen of the touch-screen device, the first portion of the keyboard containing a first corner of the keyboard and not containing a second corner of the keyboard opposing the first corner, wherein the first corner and the second corner define, at least in part, an outer periphery of the keyboard,
- detecting a touch on the touch-screen,
- detecting movement of the touch on the touch-screen,
- determining a first touch displacement value associated with the detected movement of the touch,
- determining, based at least in part on the first touch displacement value moving the keyboard on the touch-screen in a direction opposite to a direction of the detected movement of the touch and causing the first corner of the displayed keyboard to move out of a viewing area of the touch-screen, that the first touch displacement value is not sufficient to cause the second corner of the displayed keyboard to move into the viewing area of the touch-screen when the detected touch reaches an edge of the touch-screen,
- modifying the first touch displacement value to generate a second touch displacement value associated with the detected movement of the touch, wherein the second touch displacement value is sufficient to cause the second corner to move within the viewing area,
- moving the displayed keyboard based at least in part on the second touch displacement value to cause a second portion of the keyboard to be displayed on the touch-screen, the second portion of the keyboard containing the second corner,
- detecting a release of the touch from the touch-screen, and
- assigning a character according to a final location of the touch relative to a location of the displayed keyboard.

17. The computer program product of claim 16, wherein the instructions for moving the displayed keyboard comprise instructions for moving the displayed keyboard in the opposite direction to the detected movement of the touch on the touch-screen.

18. The computer program product of claim 16, wherein the instructions for moving the displayed keyboard comprise instructions for moving the displayed keyboard a distance that is greater than the first displacement value.

19. The computer program product of claim 16, further comprising instructions for highlighting the character currently located under the touch on the touch-screen.

20. The computer program product of claim 16, further comprising instructions for enlarging the displayed keyboard in response to a defined user input.

\* \* \* \* \*